(12) United States Patent
Kim et al.

(10) Patent No.: US 11,298,214 B2
(45) Date of Patent: Apr. 12, 2022

(54) OVERDENTURE HOLDER DEVICE

(71) Applicant: DIO Corporation, Busan (KR)

(72) Inventors: Jin Cheol Kim, Yangsan-si (KR); Jin Baek Kim, Busan (KR)

(73) Assignee: DIO CORPORATION, Busan (KR)

( * ) Notice: Subject to any disclaimer, the term of this patent is extended or adjusted under 35 U.S.C. 154(b) by 214 days.

(21) Appl. No.: 16/705,415

(22) Filed: Dec. 6, 2019

(65) Prior Publication Data
US 2021/0113307 A1    Apr. 22, 2021

(30) Foreign Application Priority Data

Oct. 18, 2019 (KR) .................. 10-2019-0130016
Nov. 25, 2019 (KR) .................. 10-2019-0151819
Nov. 25, 2019 (KR) .................. 10-2019-0151822

(51) Int. Cl.
*A61C 8/00* (2006.01)
*A61C 13/225* (2006.01)

(52) U.S. Cl.
CPC .......... *A61C 8/0053* (2013.01); *A61C 8/0068* (2013.01); *A61C 8/0095* (2013.01); *A61C 13/2255* (2013.01)

(58) Field of Classification Search
CPC ... A61C 8/0053; A61C 8/0068; A61C 8/0095; A61C 13/2255; A61C 13/0004
USPC ...................................... 433/172–173, 201.1
See application file for complete search history.

(56) References Cited

U.S. PATENT DOCUMENTS

2011/0046684 A1*  2/2011  Abdelgany ........ A61B 17/7037
606/305

FOREIGN PATENT DOCUMENTS

EP    1210914 A1 *  6/2002  ......... A61B 17/7037
JP    2001501109 A *  1/2001  ............ A61B 17/70

OTHER PUBLICATIONS

Inventor for JP2001501109, Multi-axial Bone Screw Assembly machine translation, Jan. 30, 2001 (Year: 2001).*

* cited by examiner

*Primary Examiner* — Nicholas D Lucchesi
*Assistant Examiner* — Mirayda A Aponte
(74) *Attorney, Agent, or Firm* — Lex IP Meister, PLLC

(57) ABSTRACT

The overdenture holder device includes a holder abutment in which a through insertion portion is formed to be opened in both directions of a body portion having a bottom end portion inserted into a top end of the fixture and protruding upward and a fastening hole penetrates along a longitudinal direction and has an inner circumferential side on which a holding step protruding radially inward is formed, a fastening screw having a bottom end portion inserted into the fastening hole to be screw-coupled with the inside of the top end of the fixture and a head portion formed at a top end portion and to be held by the holding step, and a pressurizing device coupled with a top end of the body portion and configured to provide a pressurizing force such that an outer surface of the fixing bar is fixed to an inside of the through insertion portion.

9 Claims, 8 Drawing Sheets

OVERDENTURE HOLDER DEVICE

CROSS-REFERENCE TO RELATED APPLICATION

This application claims the benefit of Korean Application No. 10-2019-130016 which was filed on Oct. 18, 2019, and Korean Application Nos. 10-2019-151819 and 10-2019-151822 which were filed on Nov. 25, 2019, which were hereby incorporated by reference as fully set forth herein.

BACKGROUND

1. Field of the Invention

The present invention relates to a digitally designed overdenture holder device ('digital overdenture holder device'), and more particularly, to a digital overdenture holder device configured to fasten a digital overdenture to an oral cavity.

2. Discussion of Related Art

In general, a denture or a dental prosthesis is an intraoral prosthesis which replaces a broken natural tooth and artificially restores an exterior and function thereof. Here, the denture or dental prosthesis may be installed in the oral cavity to restore a mastication function and to prevent the periodontium from being deformed. Such dentures or dental prostheses may be classified into partial/complete dentures and partial/complete dental prostheses according to the number of damaged teeth.

Meanwhile, dental cement is applied to an internal shape-matching groove such that the denture is bonded to and installed on a surface of a gum. Accordingly, since an occlusal pressure is directly applied to the gum, a feeling of irritation and pain are caused. On the other hand, the dental prosthesis is fixed to a fixture implanted into an alveolar bone such that a feeling of irritation and pain of a gum caused by an occlusal pressure are reduced. However, the dental prosthesis is substantially permanently fixed such that it is difficult to manage. Thus, an overdenture which overcomes disadvantages of the denture and the dental prosthesis has been disclosed.

In detail, the overdenture is fixed to a fixture implanted into an alveolar bone like the prosthesis such that pain of soft tissue of a gum is decreased. Also, the overdenture is attachable to or detachable from an oral cavity like the denture such that it is easy to perform maintenance such as cleaning and the like. Here, the overdenture includes a coupling device selectively coupled with an abutment fixed to the fixture.

Here, a conventional coupling device is provided as a ball type separately matched with each of a plurality of such fixtures/attachments implanted into and fixed to the alveolar bone or provided as a bar type which passes the plurality of fixtures/abutments.

Here, since the ball type coupling device is separately coupled with each of the fixtures/attachments, preciseness of a position of the abutment is necessary. Accordingly, when any one of the coupling devices is not formed in a precise position, an overdenture is not precisely installed.

Also, a conventional bar type coupling device includes a plurality of fixtures/abutments implanted into a target arch and a fixing bar which passes and connects the abutments. Here, the abutment includes a through hole through which the fixing bar passes, and the through hole is formed to protrude from a side surface of the abutment. Here, the through hole is formed substantially corresponding to a diameter of the fixing bar and receives a pressurizing force pressurizing and fixing the fixing bar to the through hole through a fastening screw configured to fix the abutment to the fixture.

However, the fastening screw is formed to pass through a longitudinal central part side of the abutment, and the through hole is formed at a protruding portion protruding from a side surface of the abutment. Through this, a position of providing the pressurizing force is laterally spaced apart from a position to which the pressurizing force is transferred. That is, the pressurizing force transferred through the fastening screw is biased to one side and an uneven load is applied such that a weak part of the abutment is broken.

Also, it is necessary to form the fastening screw having a length exceeding an entire length of the abutment and protruding toward an inside of the fixture. Accordingly, since a load moment caused by the pressurizing force increases, the fastening screw is broken by a masticatory force.

In addition, the through hole is formed to have a shape substantially matched with a sectional shape of the fixing bar. Accordingly, only fixing bars having a particular size may be used, utilization is degraded. Also, since a complicated and excessively precise structure is necessary for manufacturing the abutment, a level of difficulty in manufacturing increases such that manufacturing costs increase.

In addition, since the fixing bar passes a protruding part on the side surface of the abutment, a volume of the coupling device increases. Accordingly, it is necessary to form a large size of an insertion portion in the overdenture to allow the coupling device to be inserted therein and fixed thereto. Thus, a thickness of the overdenture relatively decreases such that durability thereof is decreased, such as a fracture caused by a pressure while chewing.

SUMMARY OF THE INVENTION

According to an aspect of the present invention, there is provided a digital overdenture holder device, which is configured to be fixed to a plurality of fixtures implanted into a target arch to detachably fasten a digital overdenture so as to connect a fixing bar to the plurality of fixtures. The digital overdenture holder device includes a holder abutment in which a through insertion portion is formed to be opened in both directions of a body portion having a bottom end portion inserted into a top end of the fixture and protruding upward and a fastening hole penetrates along a longitudinal direction and has an inner circumferential side on which a holding step protruding radially inward is formed, a fastening screw having a bottom end portion inserted into the fastening hole to be screw-coupled with the inside of the top end of the fixture while including a head portion formed at a top end portion and extending radially outward to be held by the holding step, and a pressurizing device coupled with a top end of the body portion corresponding to a preset pressurizing direction and configured to provide a pressurizing force such that an outer surface of the fixing bar is pressurized and fixed to an inside of the through insertion portion by adjusting an inner gap of the through insertion portion.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a cross-sectional view illustrating a coupling relationship between a digital overdenture holder device according to a first embodiment of the present invention and a digital overdenture.

DETAILED DESCRIPTION OF EXEMPLARY EMBODIMENTS

Hereinafter, a digital overdenture holder device according to one embodiment of the present invention will be described in detail with reference to the attached drawings.

Figure 1:
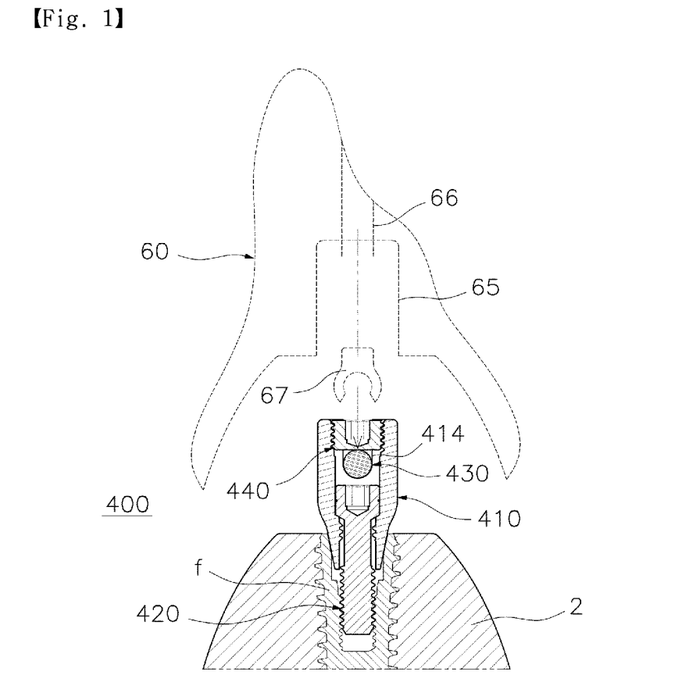
Figure 2:
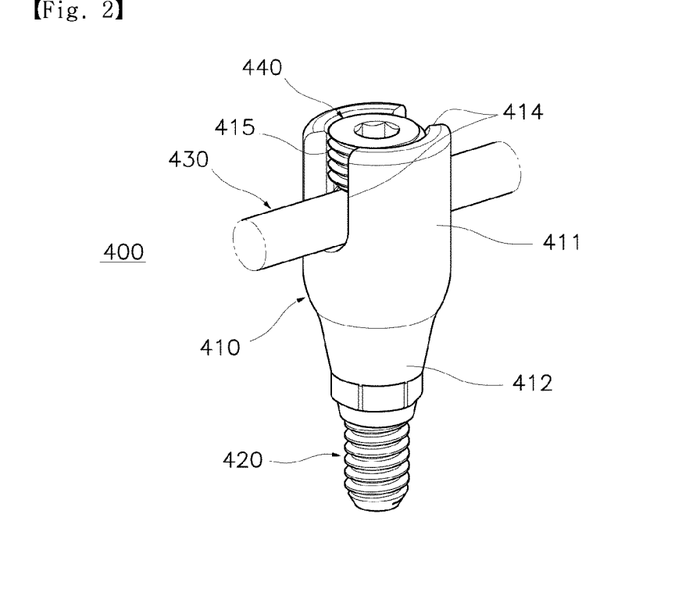
FIG. 2 is a perspective view of the digital overdenture holder device according to the first embodiment of the present invention.
Figure 3A:
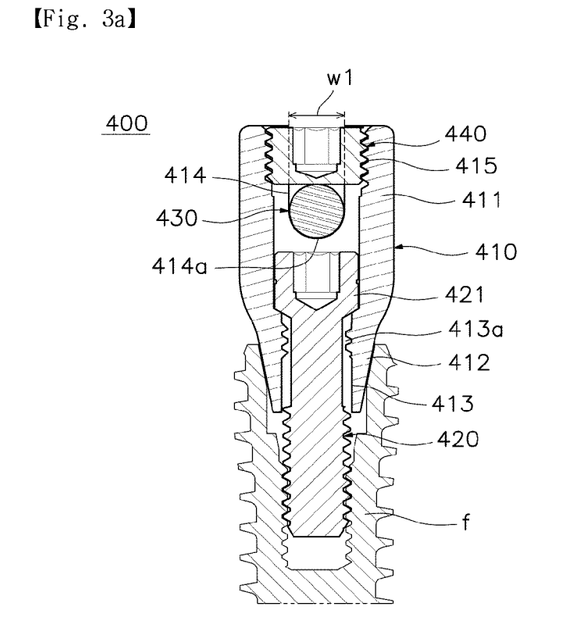
FIGS. 3A and 3B are cross-sectional views of the digital overdenture holder device according to the first embodiment of the present invention.
Figure 3B:
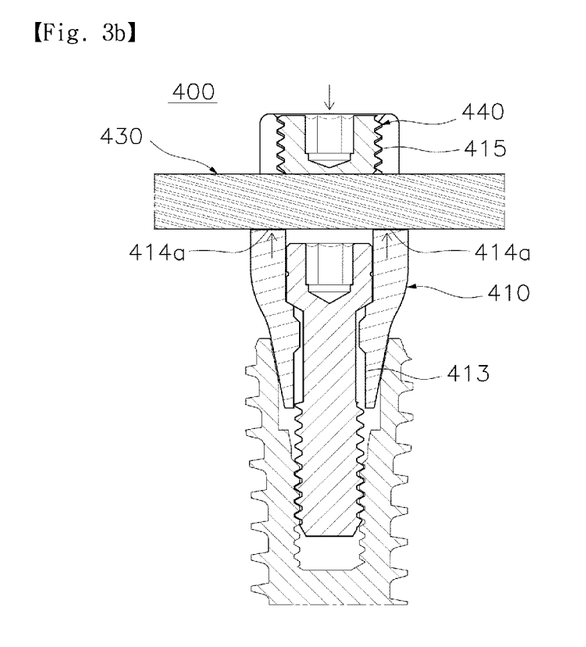

FIG. 1 is a cross-sectional view illustrating a coupling relationship between a digital overdenture holder device according to a first embodiment of the present invention and a digital overdenture. Also, FIG. 2 is a perspective view of the digital overdenture holder device according to the first embodiment of the present invention, and FIGS. 3A and 3B are cross-sectional views of the digital overdenture holder device according to the first embodiment of the present invention.

As shown in FIGS. 1 to 3B, a holder device 400 according to one embodiment of the present invention includes a holder abutment 410, a fastening screw 420, a fixing bar 430, and a pressurizing device 440.

Meanwhile, referring to FIG. 1, a digital overdenture 60 is a dental restoration installed in a target arch 2, and the holder device 400 may be understood as a device configured to fix and fasten the digital overdenture 60 to an oral cavity to be selectively detachable.

In detail, the digital overdenture 60 is a dental restoration fixed to an alveolar bone using a fixture f like a dental prosthesis while being detachably attached to an oral cavity like a denture. The digital overdenture 60 may be digitally designed and manufactured to be adequate for an oral cavity of a patient. As necessary, even in the case of the overdenture 60 regularized for mass production, the present invention may be applied when a holder insertion portion 65 is recessed corresponding to an external shape of the holder device 400 to allow the holder device 400 to be inserted therein. Here, the target arch 2 may be an edentulous jaw, and the holder device 400 may be fixed after removing a residual tooth of the target arch 2 to install the digital overdenture 60.

Here, the fixture f is previously implanted into an alveolar bone to fix the holder device 400 to the target arch 2. In detail, surface information and alveolar bone information about an oral cavity are obtained using a scanner or a computerized tomography (CT) imaging device to implant the fixture f and design and manufacture the digital overdenture 60. Also, obtained information is loaded into a planning portion and adjusted to a vertical dimension of a patient to be generated as a planning image. Here, implantation information of the fixture f and a surgical guide configured to guide implanting of the fixture f according to the implantation information are designed on the basis of the planning image and manufactured using a manufacturing apparatus. Here, since the fixing bar 430 is substantially provided to have stiffness with less strain caused by an external force, it is further necessary to flatten the alveolar bone to implant the fixture f at a certain height. To this end, a flattening guide configured to guide flattening the alveolar bone to be precisely flattened may be designed based on the planning image and manufactured using the manufacturing apparatus.

Here, the holder insertion portion 65 into which an outer surface of the holder device 400 is inserted is formed on an inner surface of the digital overdenture 60. That is, the digital overdenture 60 is precisely manufactured such that the holder device 400 is substantially shape-matched with an inner surface of the holder insertion portion 65. Through this, since shaking or twisting after installing the digital overdenture 60 is minimized, a feeling of irritation and pain when chewing or the discomfort caused by movement may be minimized.

Here, a clip 67 which allows the digital overdenture 60 to remain in a state of being fixed to the holder device 400 and is separable with a certain force being applied is provided. In detail, the clip 67 may be inserted into a fixing hole 66 preformed in the digital overdenture 60 and may be bonded and fixed thereto using a resin. Also, since the clip 67 is fixed to surround an outer surface of the fixing bar 430, the digital overdenture 60 may be stably fixed.

That is, the fixture f and a holder abutment 1410 (refer to FIG. 8) are spaced apart along a dental arch of the target arch 2 and fixed thereto such that an area of the digital overdenture 60 which is fixed to the oral cavity is formed at an entirety of a product. Also, the holder abutments 1410 (refer to FIG. 8) are connected using one fixing bar 1430 (refer to FIG. 8) bent at a preset bending angle d (refer to FIG. 8). Here, since the clip 67 fixed to the digital overdenture 60 is insertion-coupled with the fixing bar 1430, the digital overdenture 60 may be stably fixed to and easily separated from the oral cavity.

In detail, referring to FIGS. 2 to 3B, in the holder abutment 410, a connecting portion 412 is formed at a bottom end thereof to be inserted into a top end of the fixture f and a through insertion portion 414 is opened in both directions of a body portion 411 protruding upward. Here, an outer surface of the connecting portion 412 may be inserted into and shape-matched with a fastening groove formed inside the top end of the fixture f. Through this, the holder abutment 410 may be prevented from tilting or moving while being coupled with a top of the fixture f. In addition, a hexagonal protrusion aligned and shape-matched with a hexagonal groove formed in the fastening groove of the fixture f may be further formed in the connecting portion 412. The hexagonal protrusion may be formed to be aligned with the through insertion portion 414 which will be described below. Through this, when the holder abutment 410 is inserted into the top of the fixture f, the through insertion portion 414 may be fixedly aligned corresponding to a bent line bb (refer to FIG. 8) of the fixing bar 430 through shape-matching between the hexagonal protrusion and the hexagonal groove.

Also, a fastening hole 413 is formed to pass through the holder abutment 410 along a longitudinal direction of the holder abutment 410. Here, a holding step 413a may protrude from one side of an inner circumference of the fastening hole 413 in a radially inward direction. Here, the fastening screw 420 is inserted into the fastening hole 413 while a bottom end thereof is screw-fastened to the inside of the top end of the fixture f. Here, a head portion 421 extending radially outward to be held by the holding step 413a may be formed at the top end of the fastening screw 420.

Here, the fastening screw 420 may have a diameter exceeding an inner diameter of the holding step 413a while the head portion 421 is less than a diameter of the fastening hole 413. Also, the holder abutment 410 is fixed to the fixture f through a fastening force of screw-fastening a bottom end of the fastening screw 420 to the fixture f while a bottom of the head portion 421 of the fastening screw 420 is held by the holding step 413a. Here, the bottom end of the fastening screw 420 may be formed to be less than the inner diameter of the holding step 413a. Alternatively, when a screw thread formed at the bottom end of the fastening screw 420 is greater than the inner diameter of the holding step 413a, a screw groove may be formed in the holding step 413a such that the screw thread of the fastening screw 420 passes therethrough while spirally rotating.

Meanwhile, the fixing bar 430 may be provided as a wire or rod having a preset sectional shape and extending a certain length. Here, the fixing bar 430 may be bent at the bending angle so as to intersect with implantation information of the fixture f while being provided as a stiff material such that a bent state is plastically deformed and fixed. For example, the fixing bar 430 may be provided by cutting a wire or rod formed of titanium or a titanium alloy and having a preset diameter to a certain length. Also, the fixing bar 430 may have a variety of sectional shapes such as a circular shape, a polygonal shape, an elliptical shape, a D-cut shape, and the like and may be formed with a circular shape easily manufactured through drawing or extrusion. The fixing bar 430 is inserted into the through insertion portion 414 and is disposed such that both ends protrude toward both sides of the body portion 411.

In addition, the pressurizing device 440 is screw-coupled with the body portion 411 of the holder abutment 410 and provides a pressurizing force such that the fixing bar 430 is pressed against and fixed to an inside of the through insertion portion 414. Here, the pressurizing device 440 may be provided as the pressurizing screw 440 screw-coupled with a coupling groove 415. That is, hereinafter, the pressurizing device 440 and the pressurizing screw 440 may be understood as the same components and will be described and illustrated with the same reference numerals.

In detail, the coupling groove 415 is formed in the body portion 411 corresponding to a preset pressurizing direction. Also, the pressurizing screw 440 may enter and be coupled corresponding to the pressurizing direction such that an inner interval of the through insertion portion 414 may be adjusted and the outer surface of the fixing bar 430 may be pressurized and fixed to an inner end 414a of the through insertion portion 414 while coming into contact therewith.

Here, the through insertion portion 414 may be provided in the form of a slot groove which extends and is recessed corresponding to the pressurizing direction and has an opening width w1 in which a sectional thickness or a diameter of the fixing bar 430 is accommodated. Here, the opening width w1 of the through insertion portion 414 may be understood as a gap by which the through insertion portion 414 is horizontally opened. Also, accommodation of a sectional gap of the fixing bar 430 may be understood as the opening width w1 of the through insertion portion 414 is equal to or formed to be greater than the sectional thickness of the fixing bar 430 with a certain marginal gap.

Also, the coupling groove 415 may be formed in an opening side opposite to the inner end 414a of the through insertion portion 414. That is, the pressurizing screw 440 enters and is coupled with the inner end 414a of the through insertion portion 414 through the coupling groove 415. Through this, the outer surface of the fixing bar 430 may be clamped between a bottom of the pressurizing screw 440 and the inner end 414a of the through insertion portion 414 to be pressurized and firmly fixed.

In addition, the through insertion portion 414 may be recessed downward from a top end of the body portion 411 and extend along a longitudinal direction. The through insertion portion 414 is opened at both sides and the top of the body portion 411 while the inner end 414a extends to a preset point in a longitudinal direction of the body portion 411. As described above, an extension direction of the through insertion portion 414 and an extension direction of the fastening hole 413 are the same and correspond to a direction of implanting the holder abutment 410 into the fixture f. Accordingly, since the fixing bar 430 is vertically insertable from the top of the body portion 411 to the inner end 414a of the through insertion portion 414, convenience in assembling of the holder device 400 may be significantly improved.

Also, the coupling groove 415 communicates with a central part of a top end side of the through insertion portion 414 while having a diameter exceeding the opening width w1 of the through insertion portion 414. That is, the coupling groove 415 may be understood as being formed at a top end of the fastening hole 413. As described above, the coupling groove 415 and the fastening hole 413 exceed the opening width w1 of the through insertion portion 414. Accordingly, a fastening area in which both sides of an outer circumference of the pressurizing screw 440 face and are fastened to an inner side of the body portion 411 divided through the through insertion portion 414 may be secured.

Here, the fastening hole 413 passes through the holder abutment 410 in a longitudinal direction, and the coupling groove 415 is formed at the top end of the fastening hole 413. Accordingly, a pressurizing direction of the pressurizing screw 440 corresponds to the longitudinal direction of the holder abutment 410. Also, the coupling groove 415 is formed at a central part of the top end of the body portion 411 which communicates with the fastening hole 413.

Through this, when the pressurizing screw 440 is screw-coupled through the coupling groove 415, a top of the outer surface of the fixing bar 430 inserted into the through insertion portion 414 is pressurized.

Here, the through insertion portion 414 is substantially divided into both sides of the body portion 411 to be symmetrical. That is, a position of each inner end 414a of the through insertion portion 414 divided on the basis of the fastening hole 413 is formed at the same height. Accordingly, a bottom of the outer surface of the fixing bar 430 is symmetrically supported by each inner end 414a of the through insertion portion 414. Accordingly, when the fixing bar 430 is pressurized downward by the pressurizing screw 440, a load thereof is symmetrically distributed to each divided inner end 414a of the through insertion portion 414 to be uniform. Through this, as the pressurizing screw 440 is coupled, a fracture caused by applying an uneven load to the holder abutment 410 is prevented such that durability may be significantly improved.

In addition, a part of the fixing bar 430 disposed inside the fastening hole 413 is pressurized downward while parts mounted on the inner ends 414a on both sides thereof are supported upward. That is, a central part of the fixing bar 430 mounted on and supported by the inner ends 414a of the through insertion portion 414 divided into both sides is pressurized down by the pressurizing screw 440 such that an area to which a pressurizing force is applied increases. Accordingly, even when the opening width of the through insertion portion 414 is formed to be greater than the sectional thickness of the fixing bar 430, the fixing bar 430 may come into contact with and be firmly fixed to a bottom surface of the pressurizing screw 440 and the divided inner ends 414a of the through insertion portion 414.

Through this, the opening width of the through insertion portion 414 may be formed with a margin corresponding to a diameter of the fixing bar 430 having a variety of sizes so as to be applied for general use such that utilization may be significantly improved. Also, the fastening hole 413 is formed in a central part of the holder abutment 410 while having a simple shape in which the through insertion portion 414 is formed at the top end of the body portion 411 in a longitudinal direction. Accordingly, since a shape of the holder abutment 410 becomes simplified, difficulty in manufacturing decreases such that productivity may be improved.

In addition, according to the present invention, the pressurizing screw 440 enters and is coupled with the coupling groove 415 to be closer to the divided inner ends 414a of the through insertion portion 414 such that a pressurizing force is provided. That is, shape changes such as gap adjustment and the like caused by bending or crooking components included in the holder device 400 using an external force may not substantially occur. Accordingly, separation/detachment of components caused by deformation/damage of components is prevented in advance such that durability and safety may be significantly improved.

Meanwhile, the holding step 413a is spaced downward at an interval exceeding a thickness of the head portion 421 apart from the recessed inner ends 414a of the through insertion portion 414. It may be understood that the inner ends 414a of the through insertion portion 414 are formed to be spaced upward at intervals exceeding the thickness of the head portion 421 from a top edge of the holding step 413a. Accordingly, the holding step 413a is formed along an inner circumference of a lower side of the fastening hole 413. Through this, while the fastening screw 420 is inserted into and screw-coupled with the fastening hole 413, a top surface of the head portion 421 is spaced downward from the inner ends 414a of the through insertion portion 414. Accordingly, since the outer surface of the fixing bar 430 comes into substantially close contact with the inner ends 414a of the through insertion portion 414, a fixing force using the pressurizing force of the pressurizing screw 440 may be significantly improved.

Here, the holding step 413a is biased toward a bottom of the holder abutment 410 and is formed to be maximally spaced from the coupling groove 415. In addition, the fastening screw 420 fixing the holder abutment 410 to the fixture f and the pressurizing screw 440 pressurizing the fixing bar 430 are divided and separately provided. Through this, lengths of the screws may be formed to be shorter than those of conventional screws. Accordingly, since a load moment caused by the pressurizing force is minimized, a fracture or bending of each screw may be prevented and stable support strength is secured such that durability may be significantly improved.

In addition, the fixing bar 430 is inserted into a central part of a top of each holder abutment 410 such that the holder device 400 is formed to be compact. Accordingly, even when the holder insertion portion into which the holder device 400 is inserted is formed on an inner surface of the digital overdenture, a thickness supporting a masticatory pressure may be provided such that a high-priced dental restoration may be prevented from being broken or damaged.

Figure 4A:
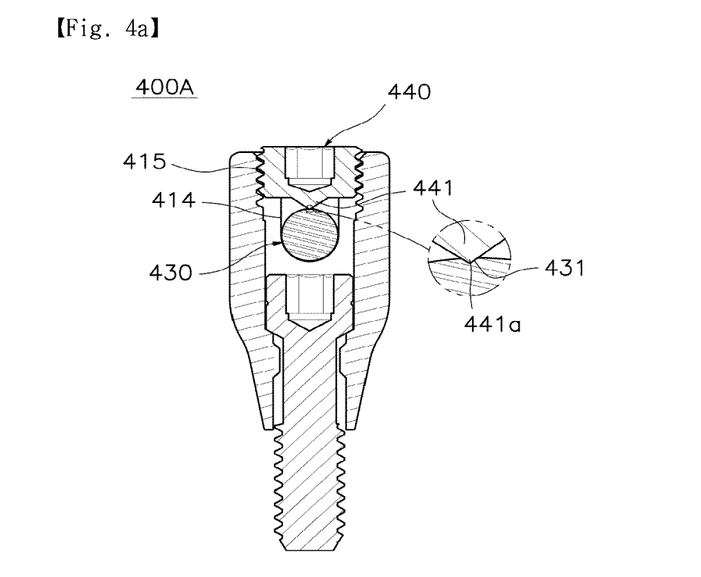
FIGS. 4A and 4B are exemplary views illustrating modified examples of the digital overdenture holder device according to the first embodiment of the present invention.
Figure 4B:
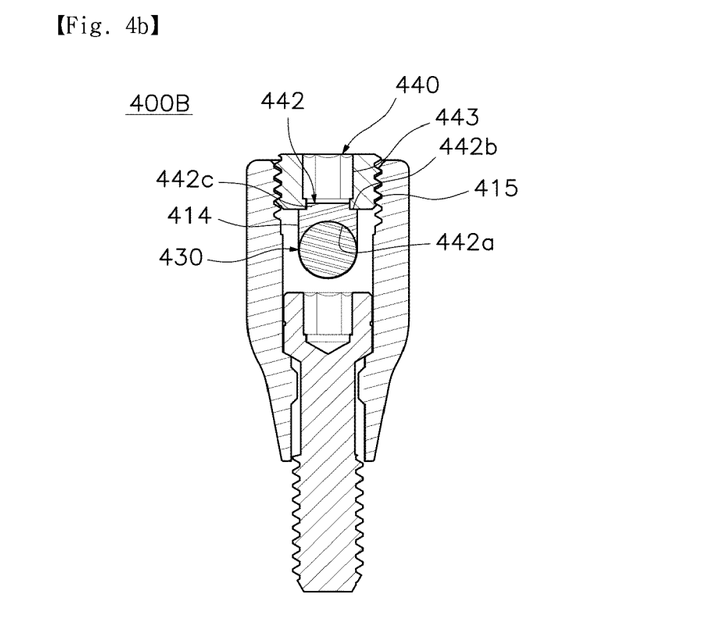

FIGS. 4A and 4B are exemplary views illustrating modified examples of the digital overdenture holder device according to the first embodiment of the present invention. In the modified examples, since basic components except a structure for firmly pressurizing and restraining the fixing bar 430 are the same as those of the above-described first embodiment, a detailed description of the same components will be omitted.

As shown in FIGS. 4A and 4B, holder devices 400A and 400B may include a component configured to firmly maintain a state in which the fixing bar 430 is pressurized and fixed to an inside of the through insertion portion 414.

In detail, referring to FIG. 4A, the pressurizing device 440 may include a wedge portion 441 which has a cross section becoming narrower toward a front end of a bottom and formed to be pointed. Accordingly, when the pressurizing device 440 is rotated by a rotating device such as a drill or driver and enters and is coupled with the coupling groove 415, an end 441a of the wedge portion 441 penetrates into the outer surface of the fixing bar 430 using the pressurizing force. Also, a wedge groove 431 shape-matched with a shape of the end 441a of the wedge portion 441 is automatically formed in the fixing bar 430.

Through this, the fixing bar 430 is pressurized-fixed while the end of the wedge portion 441 is shape-matched with and held by the wedge groove 431. Accordingly, since the fixing bar is definitely fixed while being inserted in the through insertion portion 414, movements not only upward and downward but also leftward and rightward may be prevented. Also, the wedge groove 431 is not formed by an additional preceding operation and is naturally formed by being pressurized by the wedge portion 441 during a process of pressurizing the pressurizing device 440. Accordingly, the fixing bar 430 may be firmly fixed at a precise position, and convenience in assembling may be significantly improved.

Alternatively, referring to FIG. 4B, a reinforcing fixing piece 442 filled in a space between the pressurizing device 440 and the fixing bar 430 to support the pressurizing device 440 and the fixing bar 430 may be further formed. Here, one surface 442a of the reinforcing fixing piece 442 may be shape-matched with the outer surface of the fixing bar 430, and the other surface 442b may be formed to have a shape which comes into contact with and is supported by the bottom surface of the pressurizing device 440.

In detail, when the bottom surface of the pressurizing screw 440 is formed flat and a sectional shape of the fixing bar 430 is provided as a circular shape, a space is formed outside a tangent when the bottom surface of the pressurizing screw 440 comes into contact with the outer surface of the fixing bar 430. Accordingly, the pressurizing screw 440 and the fixing bar 430 are substantially supported through linear contact.

Here, one surface 442a of the reinforcing fixing piece 442 is formed to have a planar shape corresponding to the bottom surface of the pressurizing screw 440, and the other surface 442b is formed with a concave arc-shaped groove shape to surround the outer surface of the fixing bar 430. Also, both sides of the reinforcing fixing piece 442 may be formed not to protrude outward from an edge of an outer circumference of the through insertion portion 414. The reinforcing fixing piece 442 may be manufactured using a material such as rubber, a ceramic, a resin, and the like. Also, when the reinforcing fixing piece 442 is disposed between the pressurizing screw 440 and the fixing bar 430, the reinforcing fixing piece 442 and the pressurizing screw 440 may come into surface contact with each other and the reinforcing fixing piece 442 and the fixing bar 430 may come into surface contact with each other. Through this, since a pressurizing force applied when the pressurizing screw 440 enters and is coupled through a rotating force is transferred to an entirety of the outer surface of the fixing bar 430 to pressurize and fix, firm fixation may be performed.

Here, when a polygonal groove portion 443 to which an end of the rotating device is fastened penetrates until the bottom surface of the pressurizing screw 440, an alignment protrusion 442c shape-matched with an inside of the polygonal groove portion 443 may further protrude from the other surface 442b of the reinforcing fixing piece 442. Through this, a position at which the reinforcing fixing piece 442 is disposed between the pressurizing screw 440 and the fixing bar 430 may be stably maintained. In addition, when the reinforcing fixing piece 442 is manufactured using an elastic material such as rubber and a resin, the reinforcing fixing piece 442 is compressed by a pressurizing force applied when the pressurizing screw 440 is coupled with the coupling groove 415 such that the fixing bar 430 may be pressurized and fixed with a stronger force.

Figure 5:
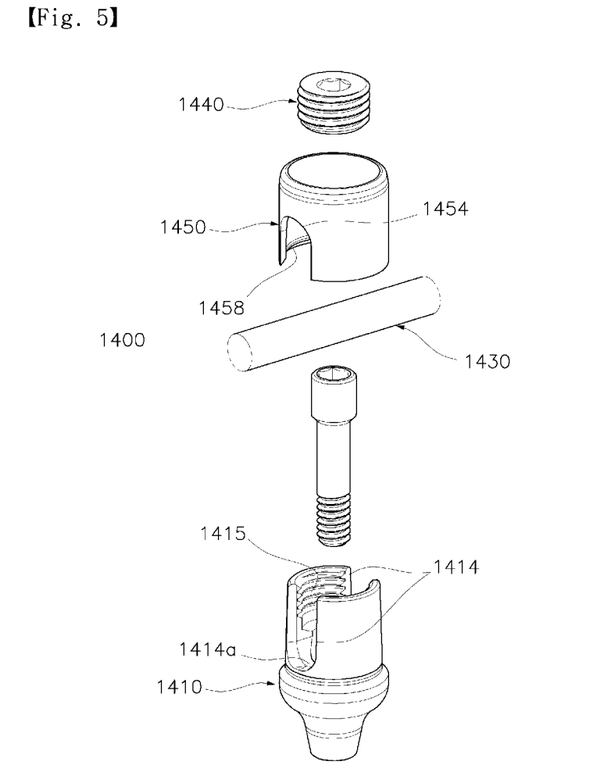
FIG. 5 is an exploded perspective view of a digital overdenture holder device according to a second embodiment of the present invention.
Figure 6:
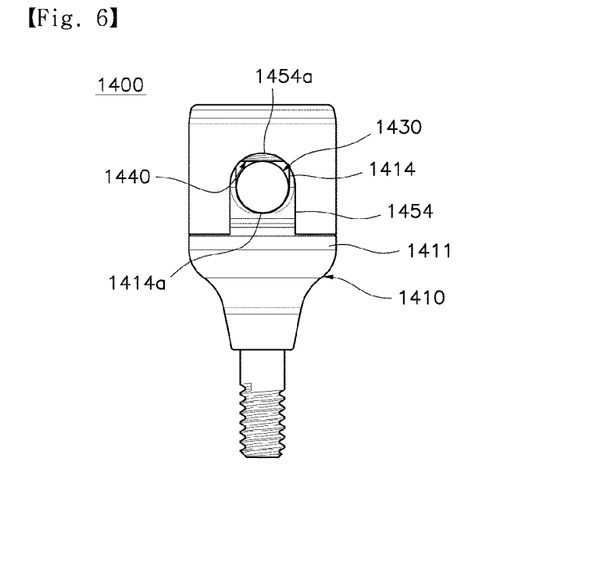
FIG. 6 is a side view of the digital overdenture holder device according to the second embodiment of the present invention.
Figure 7:
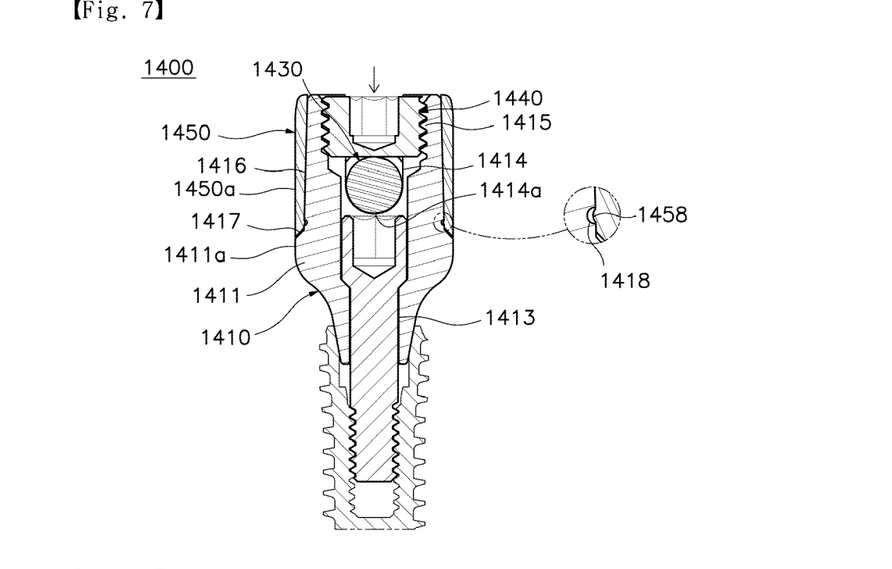
FIG. 7 is a cross-sectional view of the digital overdenture holder device according to the second embodiment of the present invention.
Figure 8:
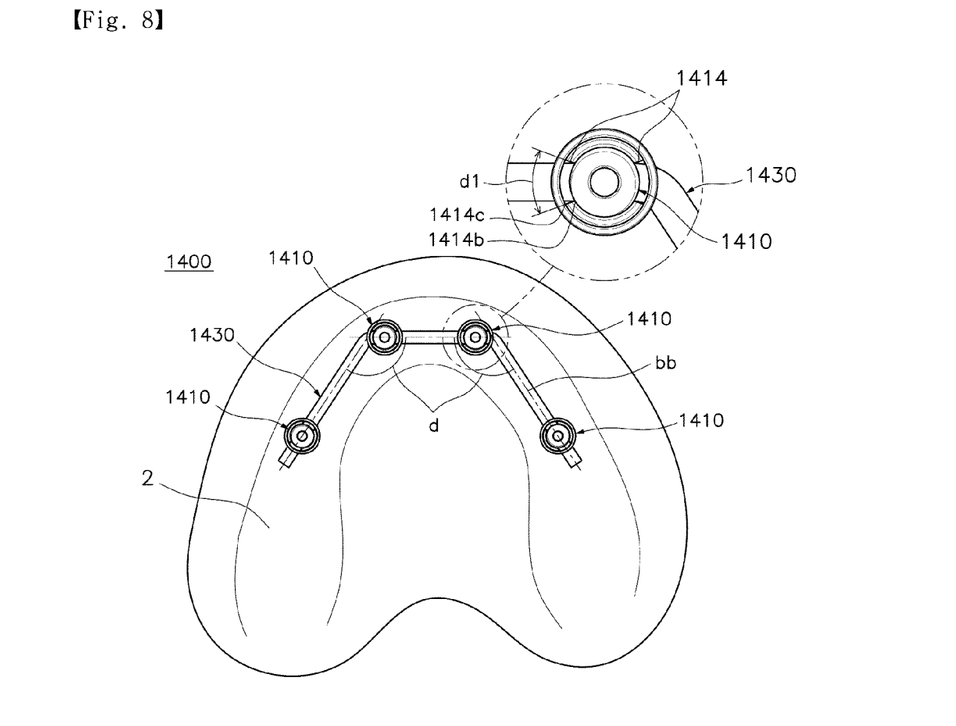
FIG. 8 is an exemplary view illustrating a state in which the digital overdenture holder device according to the second embodiment is installed in a target arch when viewed from above.

FIG. 5 is an exploded perspective view of a digital overdenture holder device according to a second embodiment of the present invention, and FIG. 6 is a side view of the digital overdenture holder device according to the second embodiment of the present invention. Also, FIG. 7 is a cross-sectional view of the digital overdenture holder device according to the second embodiment of the present invention, and FIG. 8 is an exemplary view illustrating a state in which the digital overdenture holder device according to the second embodiment is installed in a target arch when viewed from above. Since basic components of the second embodiment except a holder cover portion 1450 are the same as those of the first embodiment, a detailed description of the same components will be omitted.

Referring to FIGS. 5 to 7, the holder cover portion 1450 is formed to have a vertically penetrating hollow to surround and be coupled with an outer surface of a body portion 1411. Here, to allow both ends of a fixing bar 1430 inserted into a through insertion portion 1414 to be disposed to pass therethrough, a communication insertion portion 1454 is opened in both directions of a holder abutment 1410.

In detail, the communication insertion portion 1454 is formed on bottom ends of both sides of the holder cover portion 1450 corresponding to the through insertion portion 1414. Here, the communication insertion portion 1454 extends upward and is recessed along a longitudinal direction while being opened downward in correspondence with a coupling direction of the holder cover portion 1450. That is, the communication insertion portion 1454 may be provided in the form of a slot groove having an opening width exceeding a sectional interval of the fixing bar 1430. Accordingly, when the holder cover portion 1450 is coupled to surround an outer surface of the body portion 1411, the fixing bar 1430 is disposed between inner ends recessed opposite to the through insertion portion 1414 and the communication insertion portion 1454 and facing each other. Here, preferably, the opening width of the communication insertion portion 1454 may be formed to be greater than an opening width of the through insertion portion 1414.

Here, the holder cover portion 1450 is integrally formed to have a ring shape such that a top end 1451 thereof covers an outer side of a coupling groove 1415. That is, the top end 1451 of the holder cover portion 1450 is provided as a ring shape to surround an upwardly opened part of the through insertion portion 1414. Accordingly, it is possible to prevent the top end of the body portion 1411 which is divided by a volume of the pressurizing screw through the through insertion portion 1414 from splaying radially outward. Accordingly, it is possible to firmly maintain a state in which the pressurizing screw 1440 is screw-coupled with the coupling groove 1415. Also, the body portion 1411 is opened due to a volume according to coupling of the pressurizing screw 1440 such that deformation or a fracture caused by opening of the body portion 1411 may be prevented.

Here, a radially protruding fixing protrusion 1458 may be formed on one surface among the outer surface of the body portion 1411 and an inner surface of the holder cover portion 1450 which comes into surface contact. Also, a fixing groove portion 1418 where the fixing protrusion 1458 is inserted into and coupled with to fix the holder cover portion 1450 may be formed in the other surface among the inner surface of the holder cover portion 1450 and the outer surface of the body portion 1411 which come into surface contact. That is, the holder cover portion 1450 is moved downward from the top of the body portion 1411 and fit on the body portion 1411. Also, the fixing protrusion 1458 may be stably fixed and coupled using a simple method of being inserted into and held by the fixing groove portion 1418.

Through this, when the digital overdenture 60 (refer to FIG. 1) fixed to a holder device 1400 is separated, the holder cover portion 1450 may be inserted into the holder insertion portion 65 (refer to FIG. 1) so as to be prevented from being separated from the body portion 1411. Additionally, the pressurizing screw 1440 may be screw-coupled with the coupling groove 1415 after the holder cover portion 1450 covers and is coupled with the body portion 1411. Accordingly, as the pressurizing screw 1440 is screw-coupled, the outer surface of the body portion 1411 may come into close contact with an inner surface of the holder cover portion 1450 due to a radially outward pressurizing force applied to the body portion 1411. Accordingly, the components of the holder device 1400 may be more firmly assembled.

Here, the fixing protrusion 1458 may protrude with a width smaller than a recessed depth of the fixing groove portion 1418. Accordingly, a material substantially the same as that of the holder abutment 1411 may prevent an edge side of a bottom end of the holder cover portion 1450 manufactured using a metal material from being excessively opened and deformed even when the holder cover portion 1450 covers the body portion 1411.

Meanwhile, the body portion 1411 may have a sectional area decreased in a radially inward direction along an outer surface and include a ring-shaped step portion 1417 formed along a bottom end. Also, a coupling surface portion 1416 having a sectional area gradually decreased toward the top end of the body portion 1411 is included. That is, a top end side of the body portion 1411 having a sectional area decreased by as much as the step portion 1417 may be understood as being formed of the coupling surface portion 1416. Here, the fixing groove potion 1418 may be formed to be recessed along a top end edge of the step portion 1417. That is, the fixing groove portion 1418 is formed in the outer surface of the body portion 1411 is understood as the fixing groove portion 1418 being formed in an outer surface of the coupling surface portion 1416.

Also, the inner surface of the holder cover portion 1450 may be shape-matched with the outer surface of the coupling surface portion 1416, and an outer surface 1450a of the holder cover portion 1450 may be formed to be connected to an outer surface 1411a of the body portion 1411 as a continuous outer surface. That is, a diameter and an outer sectional shape of the holder cover portion 1450 and a diameter and an outer sectional shape of the body portion 1411 are formed to be the same. In addition, a bottom end edge of the holder cover portion 1450 is shape-matched with the step portion 1417. Accordingly, when the holder cover portion 1450 is coupled to surround the coupling surface portion 1416, the outer surface of the holder cover portion 1450 and the outer surface 1411a of the body portion 1411 may form a substantially continuous outline.

Accordingly, during a process in which the holder device 1400 is inserted into the holder insertion portion 65 formed in the digital overdenture 60, excessive protrusion or indentation of other parts except the fixing bar 1430 in a horizontal direction may be minimized Through this, an entire shape of an assembly in which the holder abutment 1410 and the holder cover portion 1450 are assembled may be formed to be simple and uncomplicated. Accordingly, even when the holder device 1400 is inserted into the holder insertion portion 65 formed on the basis thereof, they may be completely shape-matched and fixed without engagement or interference.

Also, a recessed depth of the communication insertion portion 1454 may be formed to exceed a sum of a gap between the fixing groove portion 1418 and an inner end 1414a of the through insertion portion 1414 and a sectional thickness of the fixing bar 1430. Here, the recessed depth of the communication insertion portion 1454 may be understood as a length between the bottom end edge of the holder cover portion 1450 and an inner end 1454a of the communication insertion portion 1454. That is, while the holder cover portion 1450 is coupled to surround the coupling surface portion 1416, the gap between the inner end 1414a of the through insertion portion 1414 and the inner end 1454a of the communication insertion portion 1454 may be formed to exceed the sectional thickness of the fixing bar 1430. Through this, even when the holder cover portion 1450 is coupled to surround the outer surface of the coupling surface portion 1416, the fixing bar 1430 may be prevented from coming into contact with or interfering with the inner end 1454a of the communication insertion portion 1454.

Accordingly, when the holder cover portion 11450 is coupled with the coupling surface portion 1416, the holder cover portion 1450 may be formed to have an integrated outline substantially equal to that of the body portion 1411.

Also, the fixing protrusion 1458 is precisely inserted into and coupled with the fixing groove portion 1418 so as to prevent the holder cover portion 1450 from being separated. Through this, it is possible to stably maintain, without releasing, a state in which the pressurizing screw 1440 is screw-coupled with the coupling groove 1415.

Also, referring to FIG. 8, the holder abutment 1410 is separately fixed to each of a plurality of such fixtures implanted along a dental arch of the target arch 2. Also, the fixing bar 1430 may be formed to be bent at the bending angle d so as to intersect with implantation information of the fixture.

In detail, the fixing bar 1430 is bent corresponding to a bending line bb formed by connecting a plurality of straight lines in consideration of the bending angle d so as to intersect with positions where the plurality of fixtures are implanted. Here, the bending line bb may be understood as virtual connected lines which are bent or intersect multiple times in correspondence with the bending angle d on the basis of a preset bending point. The bending line bb may be virtually calculated on the basis of alveolar bone information included in the planning image and the implantation information, and the fixing bar 1430 may be bent using a bending device to correspond to the calculated bending line bb.

Also, the through insertion portion 1414 and the communication insertion portion 1454 may be opened at an extending angle d1 corresponding to the bending line bb such that an opening gap gradually increases in a radially outward direction of the body portion 1411. That is, the through insertion portion 1414 and the communication insertion portion 1454 may be formed such that an opening width of an outer circumferential side edge 1414c corresponding to an outer side of the body portion 1411 may be formed to be greater than an opening width of an inner circumferential side edge 1414b corresponding to the fastening hole 1413. Through this, even while the fixing bar 1430 is bent and plastically deformed, the fixing bar 1430 may be inserted into the through insertion portion 1414 formed in each of a plurality of such holder abutments 1410 at the same time.

Here, an opened top end of the through insertion portion 1414 may function as an angle alignment portion which guides alignment to correspond to the bending line bb of the fixing bar 1430 bent at the bending angle d. The angle alignment portion which will be described below may be understood as being the same as the opened top end of the through insertion portion 1414.

In detail, the holder abutments 1410 may be moved toward tops of the fixtures at the same time through a holder abutment mounting guide including a plurality of accommodation grooves, in which top ends of the holder abutments 1410 are accommodated, in positions corresponding to the implantation information. Here, in the accommodation groove of the holder abutment mounting guide, an alignment shape-matched portion which is shape-matched with the angle alignment portion may be formed. That is, as the angle alignment portion and the alignment shape-matched portion are shape-matched, the through insertion portion 1414 may be mounted on the holder abutment mounting guide and moved toward the top of the fixture while being disposed in correspondence with the bending line bb. Through this, a process of fixing the holder device 1400 to the target arch 2 may be quickly and precisely performed.

Figure 9:
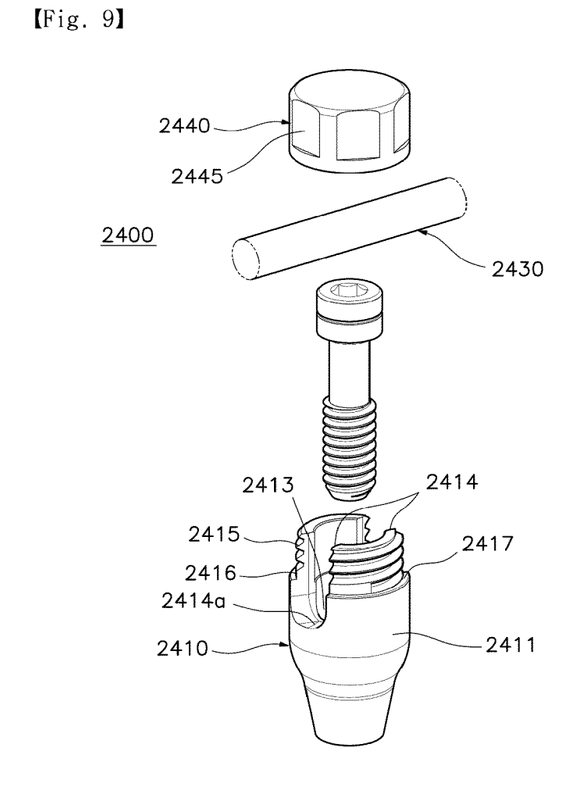
FIG. 9 is an exploded perspective view of a digital overdenture holder device according to a third embodiment of the present invention.
Figure 10:
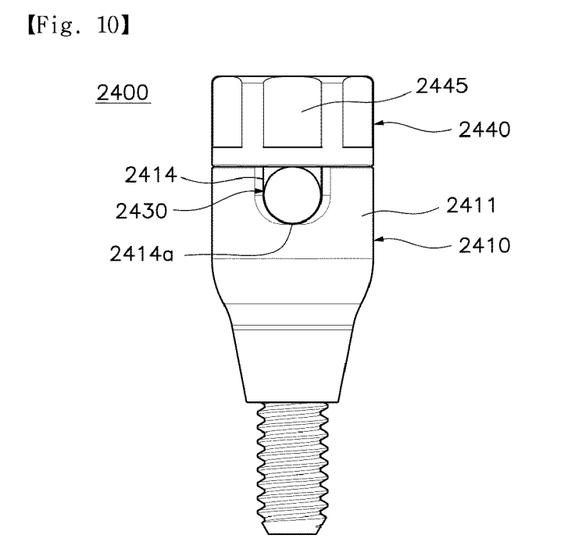
FIG. 10 is a side view of the digital overdenture holder device according to the third embodiment of the present invention.
Figure 11:
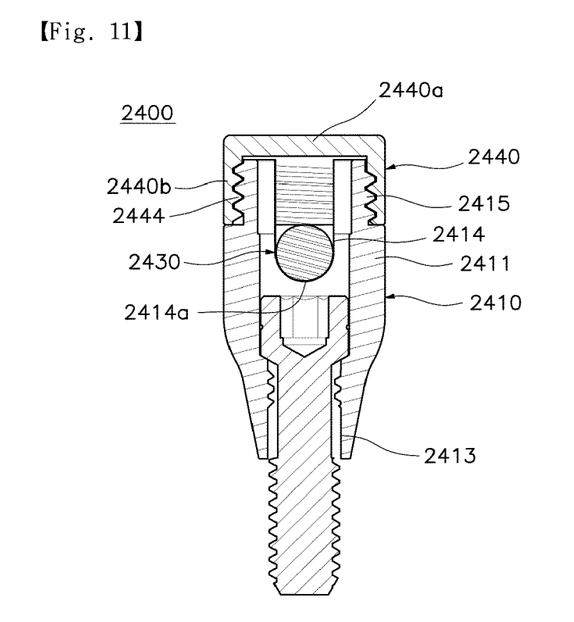
FIG. 11 is a cross-sectional view of the digital overdenture holder device according to the third embodiment of the present invention.

FIG. 9 is an exploded perspective view of a digital overdenture holder device according to a third embodiment of the present invention, and FIG. 10 is a side view of the digital overdenture holder device according to the third embodiment of the present invention. Also, FIG. 11 is a cross-sectional view of the digital overdenture holder device according to the third embodiment of the present invention. Since basic components of the embodiment except a pressurizing cap 2440 are the same as those of the above-described embodiment, a detailed description of the same components will be omitted.

Referring to FIGS. 9 to 11, in detail, a screw thread portion 2415 may be formed on a body portion 2411 along an outer circumferential surface corresponding to a preset pressurizing direction. Also, a pressurizing device may be provided as the pressurizing cap 2440 which is screw-coupled with the screw thread portion 2415 and applies a pressurizing force such that a fixing bar 2430 is pressurized and fixed to an inside of a through insertion portion 2414. That is, the pressurizing cap 2440 is screw-coupled corresponding to a pressurizing direction so as to adjust an inner gap of the through insertion portion 2414. Through this, an outer surface of the fixing bar 2430 may be clamped between a bottom end edge of the pressurizing cap 2440 and an inner end 2414*a* of the through insertion portion 2414 to be firmly fixed.

Also, the screw thread portion 2415 may be formed on a coupling surface portion 2416. That is, when the screw thread portion 2415 is formed along an outer circumference of a top end of the body portion 2411, it may be understood that the screw thread portion 2415 is substantially formed on the coupling surface portion 2416. Here, to allow the screw thread portion 2415 to be accurately screw-coupled with a screw groove portion 2444 of the pressurizing cap 2440, the coupling surface portion 2416 may be formed to have a cylindrical shape with the same diameter as a top end and a bottom end.

Here, the pressurizing cap 2440 includes an insertion groove opened downward into which the top end of the body portion 2411 is inserted. In detail, the pressurizing cap 2440 includes a top surface portion 2440*a* which covers a top of a fastening hole 2413. Also, the pressurizing cap 2440 includes a side surface portion 2440*b* extending downward along an edge of the top surface portion 2440*a* and having an outer surface formed as a continuous outer surface with an outer circumferential surface of the body portion 2411 and having an inner surface in which the screw groove portion 2444 is formed. Here, the side surface portion 2440*b* may be formed to have a thickness corresponding to a horizontally stepped gap of a step portion 2417. That is, the insertion groove may be understood as a space formed between the top surface portion 2440*a* and the side surface portion 2440*b*. Here, it may be understood that when the pressurizing cap 2440 is screw-coupled with the body portion 2411, the pressurizing cap 2440 is substantially screw-coupled with the screw thread portion 2415 formed on the coupling surface portion 2416.

That is, a diameter and an outer sectional shape of the pressurizing cap 2440 is formed to substantially correspond to a diameter and an outer sectional shape of the body portion 2411. In addition, a bottom end edge of the pressurizing cap 2440 is shape-matched with the step portion 2417. Accordingly, when the pressurizing cap 2440 is coupled to surround the coupling surface portion 2416, an outer surface of the pressurizing cap 2440 and an outer surface of the body portion 2411 may be formed with a substantially continuous outline.

In detail, when the pressurizing cap 2440 surrounds and is screw-coupled with the top end of the body portion 2411, a top of the outer surface of the fixing bar 2430 inserted into the through insertion portion 2414 is pressurized by the bottom end edge of the pressurizing cap 2440. Through this, when the pressurizing cap 2440 is merely screw-coupled, a pressurizing force pressurizing the fixing bar 2430 is provided. At the same time, the top end of the body portion 2411 divided into both sides due to the through insertion portion 2414 may be prevented from splaying radially outward by an external force. As described above, since the pressurizing cap 2440 performs a multi-function of pressurizing and fixing the fixing bar 2430 and preventing the holder abutment 2410 from being deformed, a synergistic effect of simplifying components of the device and improving durability may be provided.

Here, the through insertion portion 2414 is substantially divided into both sides by the fastening hole 2413 to be symmetrical. That is, a position of each inner end 2414*a* of the through insertion portion 2414 divided on the basis of the fastening hole 2413 is formed at the same height.

Here, the side surface portion 2440*b* may be formed with a length exceeding a length of the coupling surface portion 2416. Accordingly, when the pressurizing cap 2440 screw-coupled with the screw thread portion 2415 moves downward to be coupled, an inner side of the top surface portion 2440*a* may be prevented from coming into contact with a top end edge of the coupling surface portion 2416 and being restricted in an entry gap. Through this, the fixing bar 2430 may be pressurized against the bottom end edge of the pressurizing cap 2440 so as to be pressurized and firmly fixed to the inner end 2414*a* of the through insertion portion 2414.

Accordingly, when the fixing bar 2430 is pressurized downward by the pressurizing cap 2440, a load thereof is symmetrically distributed to each divided inner end 2414*a* of the through insertion portion 2414 to be uniform. Through this, as the pressurizing cap 2440 is coupled, a fracture caused by applying an uneven load to the holder abutment 2410 is prevented such that durability may be significantly improved.

Here, the fixing bar 2430 may be symmetrically pressurized and fixed while being spaced at both sides between bottom end edges of the side surface portion 2440*b* which surround the inner ends 2414*a* and outer sides of the through insertion portion 2414 divided into both sides. That is, since a pressurized position is spaced corresponding to a diameter of an outer circumference of the body portion 1411 even when an area pressurized between the pressurizing cap 2440 and the inner ends 2414*a* of the through insertion portion 2414 is small, a pressurizing force is uniformly transferred to the fixing bar 2430. Accordingly, even when an opening width of the through insertion portion 2414 is formed to be greater than a sectional thickness of the fixing bar 2430, the fixing bar 2430 may come into close contact with and be firmly fixed to a bottom surface of the pressurizing cap 2440 and the inner ends 2414*a* of the through insertion portion 2414.

Here, an angle alignment portion 2445 aligned with the through insertion portion 2414 may be symmetrically formed on the outer surface of the pressurizing cap 2440. Through this, both opening directions of the through insertion portion 2414 may be arranged corresponding to a bending line bb of the fixing bar 2430 bent at the bending angle d. At least one pair of such angle alignment portions 2445 is provided and a shape formed by the angle alignment portion 2445 may be provided as a hexagonal shape as shown in the drawing.

In addition, the angle alignment portion 2445 may guide an arrangement direction of the holder abutments 2410 while simultaneously functioning as a rotating force transfer surface capable of stably transferring a rotating force when the pressurizing cap 2440 is screw-coupled. Accordingly, the pressurizing cap 2440 may be firmly screw-coupled with a top end of the holder abutment 2410 even with a small force.

Also, even when the top end of the body portion 2411 is covered by the pressurizing cap 2440, a position of the angle alignment portion 2445 is fastened to coincide with the through insertion portion 2414 and may be aligned with the bending line of the fixing bar 2430.

Figure 12:
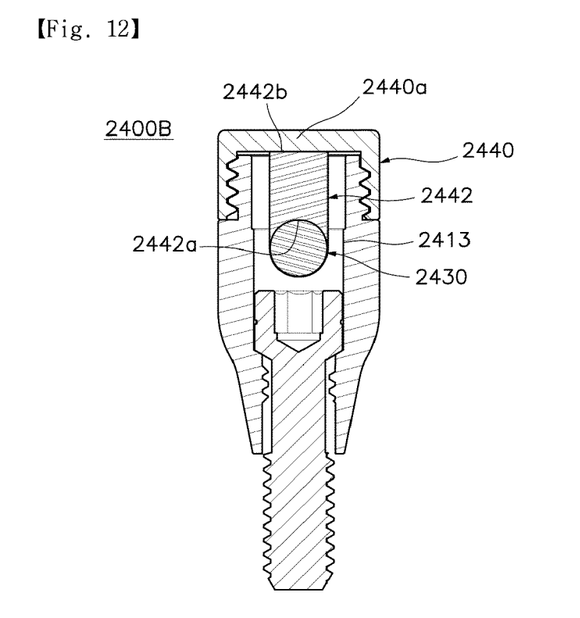
FIG. 12 is an exemplary view of a modified example of the digital overdenture holder device according to the third embodiment of the present invention.

FIG. 12 is an exemplary view of a modified example of the digital overdenture holder device according to the third embodiment of the present invention. Since basic components of the modified example except a reinforcing fixing piece 2442 are the same as those of the above-described third embodiment, a detailed description of the same components will be omitted.

Referring to FIG. 12, a holder device 2400B may further include the reinforcing fixing piece 2442 filled into a space between the pressurizing cap 2440 and the fixing bar 2430 for support. Here, one surface 2442a of the reinforcing fixing piece 2442 may be shape-matched with the outer surface of the fixing bar 2430, and the other surface 2442b may be formed to have a shape which comes into contact with and is supported by an inner surface of the top surface portion 2440a of the pressurizing cap 2440. The reinforcing fixing piece 2442 may be manufactured using a material such as rubber, a ceramic, a resin, and the like.

In detail, an inner surface of the pressurizing cap 2440, that is, the inner surface of the top surface portion 2440a is formed flat, and the fixing bar 2430 has a circular sectional shape. Also, a space is formed between the fixing bar 2430 disposed inside the fastening hole 2413 and the top surface portion 2440a of the pressurizing cap 2440.

Here, as the reinforcing fixing piece 2442 is disposed in the space, a pressurizing force of the pressurizing cap 2440 may be transferred to the fixing bar 2430 disposed inside the fastening hole 2413 through the reinforcing fixing piece 2442. Through this, since the fixing bar 2430 is firmly fixed to a precise position, a fixed position of the fixing bar 2430 may be prevented from being moved or changed even when the digital overdenture is repeatedly attached or detached.

According to the present invention, effects are provided as follows.

First, since a through insertion portion is formed in the form of a slot groove at a top end of a body portion and symmetrically divided by a fastening hole such that both sides of a fixing bar pressurized by a pressurizing screw are mounted on and supported by inner ends of the through insertion portion and a pressurizing force is uniformly distributed, a problem of a conventional apparatus in which a fracture occurs due to an uneven load is fixed such that durability can be significantly improved.

Second, since a fastening screw which fixes a holder abutment to a fixture and the pressurizing screw which pressurizes the fixing bar are separately provided such that each of the screws can be formed to have a minimum length, the load moment caused by the pressurizing force is reduced such that a stable support strength for a masticatory force can be secured while a holder device is fixed to and a digital overdenture is installed in an oral cavity.

Third, since the fixing bar is pressurized and fixed between the inner ends of the through insertion portion and a bottom surface of the pressurizing screw opposite thereto through the pressurizing force of the pressurizing screw screw-fastened to a coupling groove, an opening width of the through insertion portion is formed to have a marginal space greater than a diameter of the fixing bar such that fixing bars having a variety of sizes can be applied for general use and utilization can be significantly improved.

Fourth, since a top end portion of the holder cover portion is integrally formed in a ring shape to surround an outer side of the coupling groove, although the body portion is divided by the through insertion portion, splaying radially outward when the pressurizing screw is screw-coupled can be prevented such that fastening stability can be improved and durability can be increased by preventing deformation and a fracture of the body portion.

Fifth, since a pressurizing cap surrounds and is screw-coupled with a top end of the body portion such that a clamping fixing function of the fixing bar and a multi-function of preventing the body portion divided by the through insertion portion from splaying radially outward are performed, components of the holder device are simplified while durability is improved by preventing deformation and a fracture of the body portion.

As described above, the present invention is not limited to the above-described embodiments and may be modified by one of ordinary skill in the art without departing from the scope of the claims of the present invention and such modifications are included within the scope of the present invention.

What is claimed is:

1. An overdenture holder device, which is configured to be fixed to a plurality of fixtures implanted into a target arch to detachably fasten an overdenture so as to connect a fixing bar to the plurality of fixtures, the overdenture holder device comprising:

a holder abutment in which a through insertion portion is formed to be opened in both directions of a body portion having a bottom end portion inserted into a top end of the fixture and a fastening hole which penetrates the body portion in a longitudinal direction and has an inner circumferential side;

a fastening screw having a bottom end portion inserted into the fastening hole to be screw-coupled with the inside of the top end of the fixture and a head portion formed at a top end portion of the fastening screw, the head portion extending radially outward; and a pressurizing device coupled with a top end of the body portion corresponding to a preset pressurizing direction and configured to provide a pressurizing force such that an outer surface of the fixing bar is pressurized and fixed to an inside of the through insertion portion by adjusting an inner gap of the through insertion portion, wherein in order to pressurize the outer surface of the fixing bar between an inner end of the through insertion portion and a bottom surface of the pressurizing device, a coupling groove which communicates with a central part of a top end of the through insertion portion while having a diameter exceeding an opening width of the through insertion portion is formed at a top end of the fastening hole in the body portion, and wherein the pressurizing device is provided as a pressurizing screw screw-coupled with the coupling groove and configured to pressurize the fixing bar toward the inner end of the through insertion portion, wherein the overdenture holder device further comprising a holder cover portion which has a vertically penetrating hollow to surround and be coupled with an outer surface of a top end portion of the body portion with which the pressurizing screw is coupled and comprises a communication insertion portion formed at bottom ends of both sides corresponding to the through insertion portion, opened downward, and extending along a longitudinal direction while being recessed upward such that both ends of the fixing bar inserted into the through insertion portion pass therethrough and are disposed, wherein the holder cover portion is integrally formed in a ring shape such that a top end portion covers an outer side of the coupling groove, and wherein a fixing protrusion protruding in a radial direction is formed on one surface of an inner surface of the holder cover portion and an outer surface of the body portion which come into surface contact, and a fixing groove portion in which the fixing protrusion is inserted and coupled therewith to fix the holder cover portion is formed in the other surface.

2. The overdenture holder device of claim 1, wherein the through insertion portion is formed in the form of a slot groove which extends along a longitudinal direction, is recessed downward from the top end of the body portion, and has an opening width accommodating a sectional thickness of the fixing bar.

3. The overdenture holder device of claim 1, wherein the body portion comprises a coupling surface portion having a sectional area gradually decreased radially inward along the outer surface and including a ring-shaped step portion formed along a bottom end portion and the sectional area being gradually decreased toward a top end while the fixing groove portion is formed to be recessed along a top end edge of the step portion, and wherein the holder cover portion has an inner surface shape-matched with an outer surface of the coupling surface portion and an outer surface formed to be connected to the outer surface of the body portion as a continuous outer surface while the fixing protrusion protrudes inside a bottom end edge shape-matched with the step portion.

4. The overdenture holder device of claim 1, wherein a recessed depth of the communication insertion portion is formed as a length exceeding a sum of an interval between the fixing groove portion and the inner end of the through insertion portion and a sectional thickness of the fixing bar.

5. The overdenture holder device of claim 1, wherein the pressurizing device is provided as a pressurizing cap comprising an insertion groove which is formed to be opened downward, into which a top end of the body portion is inserted, and is screw-fastened to a screw thread portion formed on an outer circumferential surface of the body portion and comprising a screw groove portion formed along an inner circumference to provide a pressurizing force to the fixing bar corresponding to a preset pressurizing direction.

6. The overdenture holder device of claim 5, wherein at least one pair of angle alignment portions aligned with the through insertion portion are symmetrically formed on an outer surface of the pressurizing cap such that both opening directions of the through insertion portion correspond to a bending line of the fixing bar bent at the bending angle.

7. The overdenture holder device of claim 5, wherein the body portion comprises a coupling surface portion having a sectional area decreased radially inward along an outer circumferential surface and including a ring-shaped step portion formed along a bottom end portion wherein the screw thread portion is formed on an outer circumferential surface, and wherein the pressurizing cap comprises a top surface portion which covers a top of the fastening hole and a side surface portion extending downward along an edge of the top surface portion and having an outer surface formed as a continuous outer surface of an outer circumferential surface of the body portion and an inner surface in which the screw groove portion is formed.

8. The overdenture holder device of claim 7, wherein the side surface portion is formed to have a length exceeding a length of the coupling surface portion such that the fixing bar is pressurized against a bottom end edge of the pressurizing cap and clamped-fixed between the bottom end edge of the pressurizing cap and the inner end of the through insertion portion, and wherein the holding step is spaced downward at an interval exceeding a thickness of the head portion from the recessed inner end of the through insertion portion and formed along an inner circumference of a bottom of the fastening hole.

9. The overdenture holder device of claim 1, wherein the holder abutment is separately fixed to each of the plurality of fixtures implanted along a dental arch of the target arch while the fixing bar is bent to be rounded with a preset curvature corresponding to an implantation line of the fixtures, and wherein the through insertion portion is opened at an extension angle corresponding to the curvature such that an opening width gradually increases in a radially outward direction of the body portion.

* * * * *